(12) United States Patent
Patsouris et al.

(10) Patent No.: US 11,131,270 B2
(45) Date of Patent: Sep. 28, 2021

(54) TURBOJET EQUIPPED WITH A DOUBLE-ACTION ACTUATOR, WHICH CAN BE USED TO CONTROL REVERSE THRUST

(71) Applicant: SAFRAN AIRCRAFT ENGINES, Paris (FR)

(72) Inventors: Emmanuel Pierre Dimitri Patsouris, Moissy-Cramayel (FR); Quentin Matthias Emmanuel Garnaud, Moissy-Cramayel (FR); Antoine Elie Hellegouarch, Moissy-Cramayel (FR); Martial Alexandre Monseu, Moissy-Cramayel (FR); Clementine Charlotte Marie Mouton, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 73 days.

(21) Appl. No.: 16/227,237

(22) Filed: Dec. 20, 2018

(65) Prior Publication Data
US 2019/0195170 A1 Jun. 27, 2019

(30) Foreign Application Priority Data
Dec. 21, 2017 (FR) ...................................... 17 62892

(51) Int. Cl.
*F02K 1/76* (2006.01)
*F02K 1/72* (2006.01)
*F16H 25/20* (2006.01)

(52) U.S. Cl.
CPC ............... *F02K 1/763* (2013.01); *F02K 1/72* (2013.01); *F02K 1/766* (2013.01); *F05D 2260/57* (2013.01); *F16H 25/2056* (2013.01)

(58) Field of Classification Search
CPC . F02K 1/763; F02K 1/72; F02K 1/766; F05D 2260/57; F16H 25/2056
See application file for complete search history.

(56) References Cited

U.S. PATENT DOCUMENTS

| 2,410,695 | A | * | 11/1946 | Werner | ............... | F16H 25/2015 |
| | | | | | | 192/142 R |
| 3,404,581 | A | * | 10/1968 | Kraus | ................. | F16H 25/2204 |
| | | | | | | 74/89.35 |

(Continued)

FOREIGN PATENT DOCUMENTS

| EP | 1 785 346 A2 | 5/2007 |
| FR | 2 917 788 A1 | 12/2008 |

(Continued)

OTHER PUBLICATIONS

French Preliminary Search Report dated Sep. 3, 2018 in French Application 17 62892 filed on Dec. 21, 2017 (with English Translation of Categories of Cited Documents).

*Primary Examiner* — Ted Kim
(74) *Attorney, Agent, or Firm* — Oblon, McClelland, Maier & Neustadt, L.L.P.

(57) ABSTRACT

The turbojet includes, linking two of its parts as a main nacelle portion and a rear nacelle portion, a device which moves them relative to one another, for example in order to open a reverse gas thrust slot. The device includes a sleeve and two rods which are coaxial connected together by two screw links and two locking devices which may be engaged independently, such that the deployment of one of the rods results in the opening of the slot and the movement of the other rod, controlled by the same device, only occurs under specific turbojet maintenance circumstances.

8 Claims, 3 Drawing Sheets

(56) References Cited

U.S. PATENT DOCUMENTS

| | | | | |
|---|---|---|---|---|
| 5,015,897 A | * | 5/1991 | Inagaki | H02K 5/148 |
| | | | | 310/239 |
| 2005/0001095 A1 | * | 1/2005 | Christensen | F02K 1/766 |
| | | | | 244/110 B |
| 2007/0057119 A1 | * | 3/2007 | McAuley | F02K 1/766 |
| | | | | 244/110 B |
| 2009/0102252 A1 | * | 4/2009 | Geyer | B62J 1/00 |
| | | | | 297/215.13 |
| 2010/0001123 A1 | * | 1/2010 | Hillereau | F02K 1/72 |
| | | | | 244/54 |
| 2010/0192715 A1 | * | 8/2010 | Vauchel | F16H 25/20 |
| | | | | 74/89.35 |
| 2010/0218479 A1 | * | 9/2010 | Moradell-Casellas | F02K 1/72 |
| | | | | 60/226.2 |
| 2011/0296812 A1 | * | 12/2011 | Abel | F02K 1/763 |
| | | | | 60/226.2 |
| 2012/0137654 A1 | * | 6/2012 | Burgess | F02K 1/09 |
| | | | | 60/204 |
| 2013/0280031 A1 | | 10/2013 | Hurlin et al. | |
| 2015/0097056 A1 | * | 4/2015 | Caruel | F02K 1/763 |
| | | | | 239/265.19 |
| 2016/0053720 A1 | * | 2/2016 | Kioua | F02K 1/72 |
| | | | | 415/148 |
| 2017/0370325 A1 | | 12/2017 | Fert | |
| 2019/0003562 A1 | * | 1/2019 | Hawksworth | F16H 25/2454 |

FOREIGN PATENT DOCUMENTS

| | | |
|---|---|---|
| FR | 2 978 516 A1 | 2/2013 |
| FR | 3 027 065 A1 | 4/2016 |
| WO | WO 2012/045970 A1 | 4/2012 |

\* cited by examiner

TURBOJET EQUIPPED WITH A DOUBLE-ACTION ACTUATOR, WHICH CAN BE USED TO CONTROL REVERSE THRUST

The subject of the present invention is a turbojet, equipped with a double-action actuator which can in particular be employed to control reverse thrust.

Some actuators which control the movement of one turbojet element relative to another may be used in different contexts where are asked to carry out services which are also different. Such a situation is encountered in some reverse thrust devices where an element of the nacelle which forms the external skin of the turbojet is moved in order to open a circular slot through which the gas flow emerges from the turbojet whilst being deviated by the flaps of the reverse thrust system. In certain circumstances, however, involving maintenance of the turbojet when it is not running, a greater displacement is desired in order to favor access to the interior of the turbojet once the slot is widened. This requirement may easily be met by increasing the length of the actuator, which is conventionally an ordinary piston actuator which can be deployed in a translation motion. The greater actuator dimensions that are then required can however make is difficult or impossible to incorporate the device, within the nacelle or outside it.

The prior art includes the document FR-3027065-A relating to a reverse thrust system and which describes in particular a folding grid with fins and a pair of coaxial cylinders whose rods are operated independently and slide one inside the other. One of the rods moves the rear of the nacelle to open it, whilst the other serves to deploy the grid responsible for the reverse thrust. However, if greater movement of the rear of the nacelle is desired, the cylinder rod in question must be elongated, so that this system does not avoid the aforementioned drawback.

Another document is WO-2012/045970-A1. Here again a conventional cylinder with a rod that undergoes translation motion is used to control the movement of a rear part of the nacelle in order to open a reverse thrust slot. The grids responsible for reverse thrust may be detached from the main part of the nacelle in order to be moved and allow access to the turbojet through the slot. Here once again extension of the piston would however be necessary in order to displace the rear part of the nacelle more and to widen the slot to allow easier access.

In accordance with the invention an actuator has therefore been designed which is mounted between two elements of a turbojet structure in order to move them relative to one another, and which does not have the drawback of requiring a longer length in the normal state in order to cause a greater displacement under specific circumstances.

One general aspect of the invention is therefore a turbojet, characterized in that it comprises, linking a first element and a second element of its structure, a device which comprises a first rod, fixed to the second element, a second rod concentric with the first rod, an actuator shaft which is concentric with the first rod and the second rod and mounted on the first element being able to pivot on it, where links using nut and screw connect the second rod on the one hand to the first rod and on the other to the actuator shaft, the removable means of locking between the second rod and the first rod on the one hand, the shaft on the other hand; the shaft, the first rod and the second rod being coaxial with a central shaft of the device and an actuator fixed to the first structure element and which causes pivoting of the actuator shaft.

A more specific form envisaged for the invention is characterized in that the first rod is a central rod, the second rod is a hollow rod arranged around the central rod, and the actuator shaft is a sleeve arranged around the hollow rod.

The advantage of this device is that the actuator is a cylinder with a telescopic rod which therefore occupies a short length in the retracted state. The locking means make it easy to switch between normal service in which one only of the cylinder rods deploys and which therefore corresponds, in the principal application envisaged, to an opening of the nacelle which allows reverse thrust, and a specific service where the other rod also deploys and which corresponds to the larger opening desired for servicing (maintenance of the turbojet when not in service). Unlike the device in the previously mentioned document, the rods are combined one with the other by combining their movements, and because of this occupy a lesser length when the device is retracted. Furthermore the locking means allow a single actuator to be used for both deployments of the device.

In one main application envisaged, the first element and the second element are portions in the extension of an external nacelle, and the device shaft is parallel to a central axis of the turbojet; and in particular, the first element may be a main portion of the nacelle, and the second element is an extreme rear portion of the nacelle; a reverse thrust device (known per se) can then be located between them.

The use of nut and screw links in combination with the locking means can therefore be used to transmit the movement of the sleeve to the first rod by means of the second rod, and allow a single actuator to be used. It is therefore preferable that the devices used in practice are ball screws.

The actuator is advantageously a removable motor which may be removed during maintenance and replaced with a tool, such as a power driver, in order to fully deploy the actuator. The turbojet may thus remain completely inert.

According to another advantageous arrangement, the sleeve, the first rod and the second rod are arranged as a plurality of examples with the device axes parallel to each other, and there is a single actuator which causes the sleeves to pivot by a transmission which comprises a portion common to all said examples of the device.

The locking means may each comprise a pin which moves perpendicularly to the axis of the device, between a locking position and an unlocking position between the second rod and either the first rod or the sleeve. These locking means have the advantage of simplicity and may be easily actuated, even manually, which does not hinder the correct implementation of the invention, since only one of the rods is to be deployed in the envisaged application when the turbojet is active and no switching of the locking means is therefore necessary.

Finally, at least one of the locking means advantageously allows two locking positions which correspond respectively to a retraction position of one of the rods and a deployed position of this rod, in order that this rod may be kept, as desired, withdrawn (and only deployment of the other allowed) in normal service, or, on the contrary kept deployed (when maximum deployment of the device has been achieved, in order to prevent accidental retraction).

The various aspects, characteristics and advantages of the invention will now be described by means of the following figures, which are nevertheless for illustrative purposes only in order to illustrate one particular embodiment which is not exclusive of others:

Figure 6:
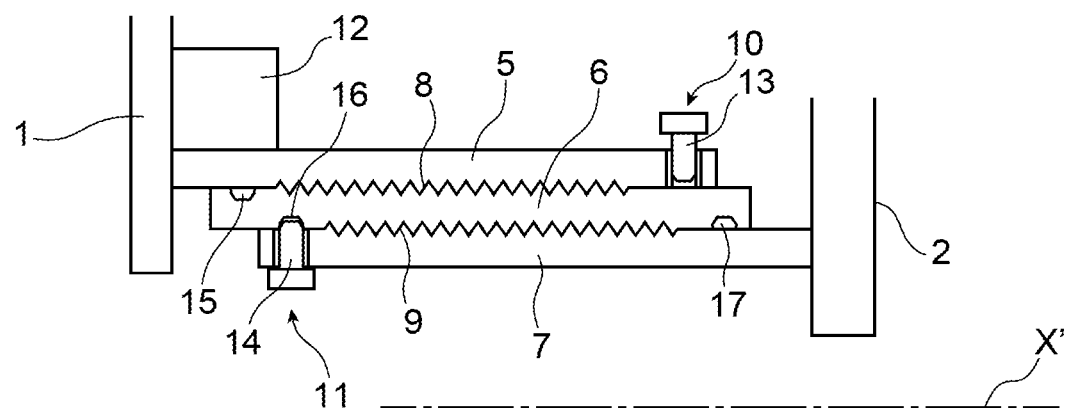
Figure 7:
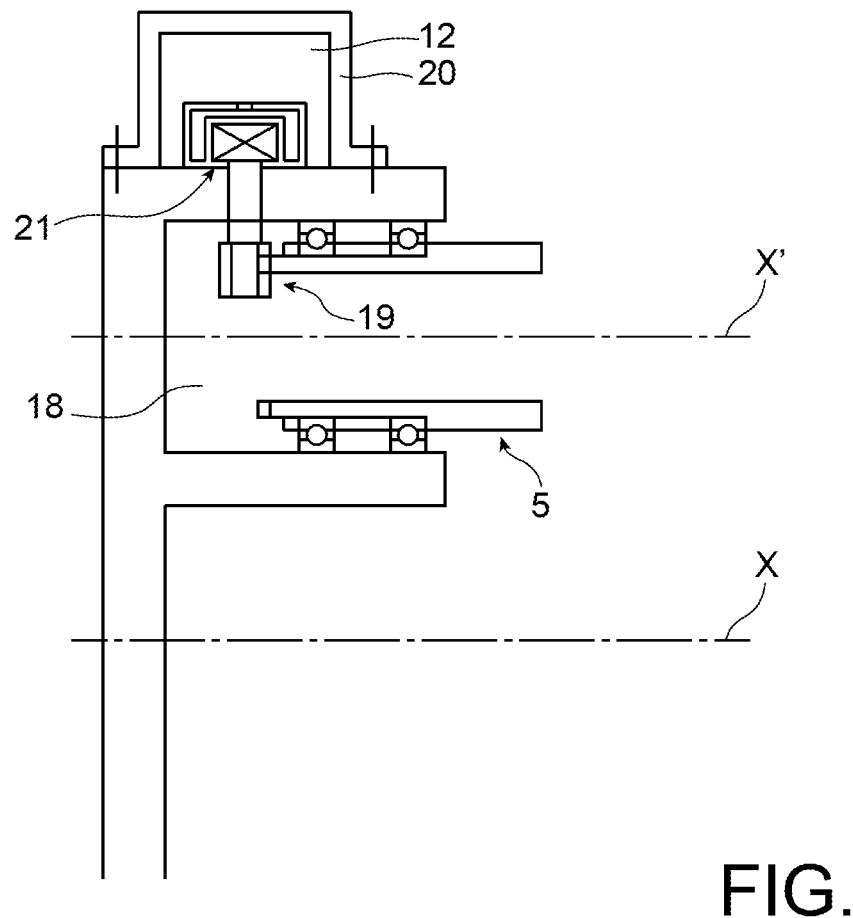

and FIGS. 6 and 7 show certain technological details of the construction of the device.

Figure 1:
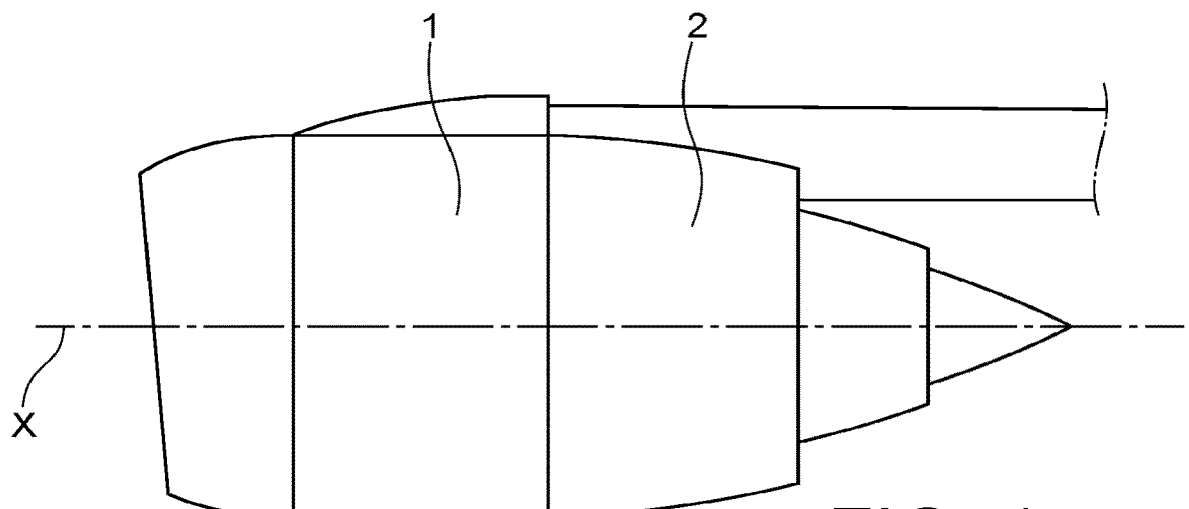
FIGS. 1 and 2 show two fundamental states of a turbojet whose nacelle is used for reverse thrust.
Figure 2:
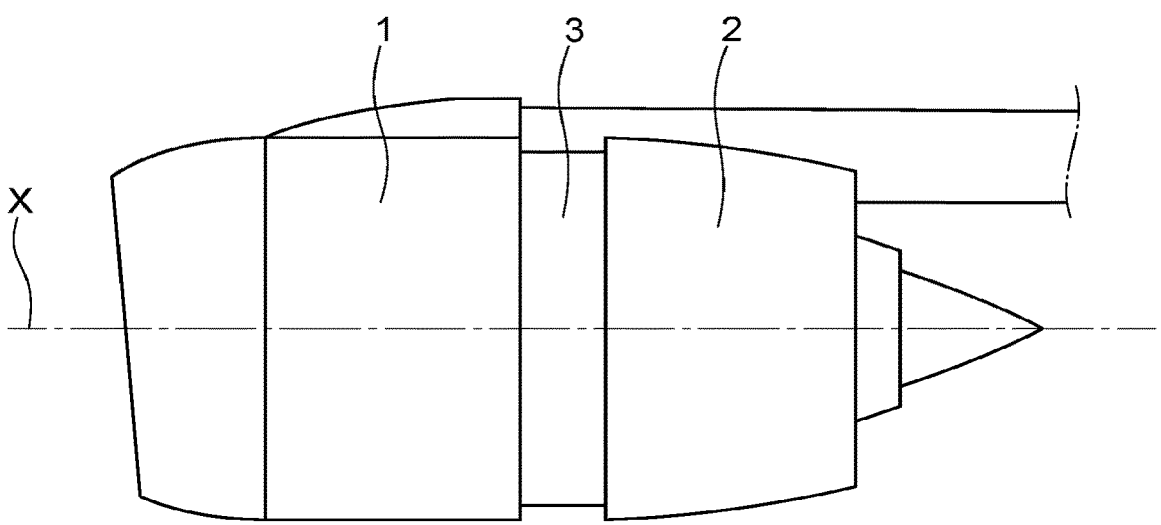

A turbojet comprises an external nacelle which surrounds it, formed of a main part 1 and of a rear part 2 which succeeds it in the direction of the axis X. This turbojet has a reverse thrust device and consequently can assume a main service state where the main part 1 and the rear part 2 form a single part, shown in FIG. 1, and a state in which reverse thrust is carried out, shown in FIG. 2, where the rear part 2 of the nacelle has been pushed towards the rear in order to open a circumferential slot between it and the main part 1.

The device 4 used for this comprises (FIG. 3) a sleeve 5, a hollow rod 6 and a central rod 7 which are coaxial around an axis of the device X' which is parallel to the central axis X of the turbojet. The sleeve 5 is mounted on the main part 1 and is able to pivot, and surrounds the hollow rod 6. The central rod 7 is fixed to the rear part 2, and is surrounded by the hollow rod 6. The sleeve is connected to the hollow rod 6 and supports it by a nut and screw link 8 and similarly the hollow rod 6 is connected to the central rod 7 and supports it by means of a second nut and screw link 9. The nut and screw links 8 and 9 comprise intermediate ball bearings 22. A first locking system 10 connects, at will, the hollow rod 6 and the sleeve 5 and a second locking means 11 similarly connects, at will, the hollow rod 6 and the central rod 7. An electric motor 12, mounted on the main part, can turn the sleeve 5 around its axis X'.

Figure 3:
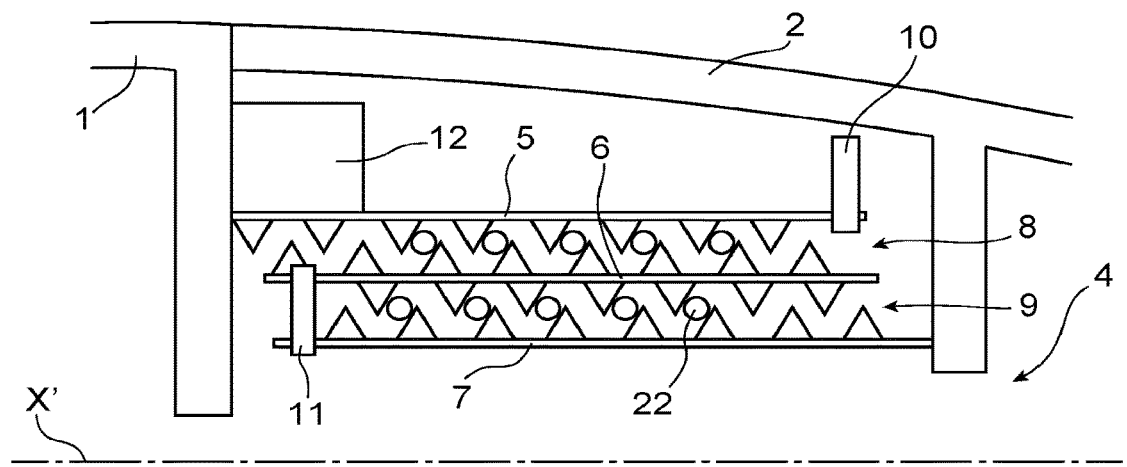
FIGS. 3, 4 and 5 show three fundamental states of the device which characterizes the invention.
Figure 4:
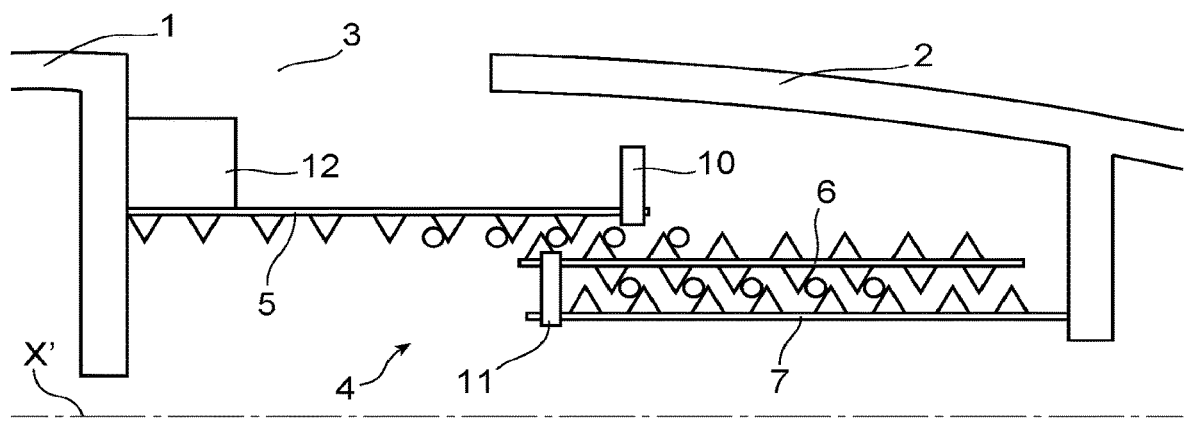
Figure 5:
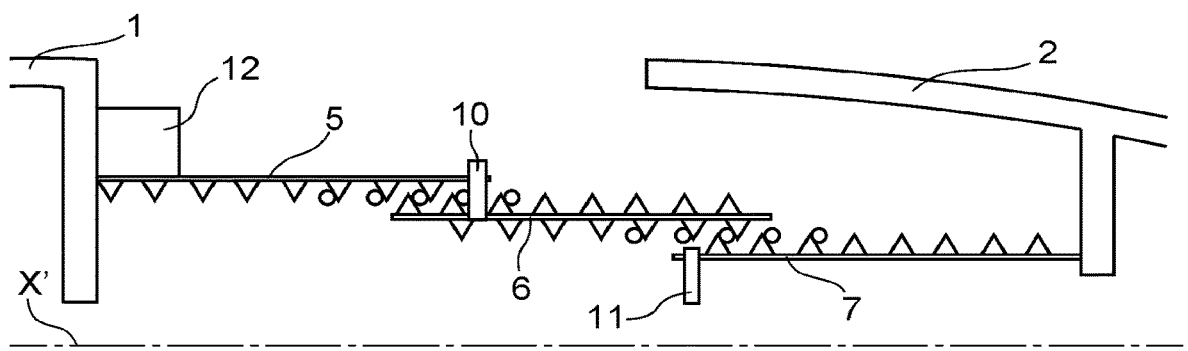

The device 4 is shown in the retracted state in FIG. 3, with the hollow rod 6 and the central rod 7 being located in the central volume of the sleeve 5, emerging only slightly from it relative to the axis X'. Greater emerging lengths for rods 6 and 7 would be acceptable. Moreover the first locking means 10 is released form the hollow rod 6 and the second locking means 11 is engaged in the hollow rod 6. This latter is therefore separated from the sleeve 5 but remains firmly attached to the central rod 7. If the electric motor 12 then turns the sleeve 5, the first ball screw device 8 produces joint translation motion of the hollow rod 6 and of the central rod 7, causing them to gradually emerge from the sleeve 5, which moved the rear part 2 towards the rear and opens the slot 3. The corresponding state is shown in FIG. 4. In this position, both locking means 10 and 11 may be switched, that-is-to say, the first means 10 is engaged in the central rod 6 and the second 11 is disengaged from the central rod 6, which therefore becomes firmly attached to the sleeve 5 and separated from the central rod 7. And if the rotation of the electric motor 12 resumes, the hollow rod 6 then rotates in unison with the sleeve 5, instead of remaining immobile in terms of rotation with the central rod 7 as before, and relative rotation between the hollow rod 6 and the central rod 7 now results. As a consequence of this, the second nut and screw device 9 deploys the central rod 7 towards the rear outside the hollow rod 6, and widens the slot 3 until the device 4 is fully deployed, as shown in FIG. 5. One advantage of the two removable locking means 10 and 11 being controlled as desired, and here manually, is that switching can be carried out solely by a voluntary and deliberate action on the ground, and eliminates accidental changeover during flight to the fully open state of FIG. 5, which would be dangerous.

FIG. 6 shows that each of the locking means 10 and 11 may comprise a pin, respectively 13 or 14, which is engaged either through the sleeve 5 or the central rod 7, and which is capable of ensuring locking by entering into a circular groove 15 or 16 made respectively in the external face and the internal face of the hollow rod 6, at the end of the latter close to the main part 1 beyond the ball-screw devices 8 or 9. The operation of pins 13 or 14, performed during maintenance operation, may be manual and achieved by a screwing a thread. An additional circular groove 17 may be provided at the opposite end of the interior face of the hollow rod 6 if immobilization of the device 4 in the fully deployed position in FIG. 5 is desired.

FIG. 7 shows that the sleeve 5 may be held in a hole 18 in the main part 1, and the electric motor 12, fitted outside the hole 18, may rotate the sleeve 5 through a transmission 19 which engages with a toothed section of the sleeve 5. The electric motor 12 may be removable and withdrawn from the main part 1, by removing an armature 20 which maintains it on the latter. The input end 21 of the transmission 19 is therefore disengaged, which allows it to be operated by a power-driver or by a similar tool during maintenance operations.

The electric motor 12 may drive several devices 4 at the same time, where these devices conform to those which have been described and which are distributed over the circumference of the main part 1 in order to avoid cantilever force on the rear part 2. The transmission 19 of each of these devices 4 may then be achieved by a common portion which may take the form of a torsion-resistant circular cable which engages with each input end 21 and whose motion is controlled by the single electric motor 12.

The roles of the central rod 7 of the hollow rod 6 may be reversed, that-is-to say that only the central rod 7 would be deployed during service of the turbojet, with the hollow rod 6 only then deploying subsequently, after switching of the locking means 10 and 11. The state of the two locking means 10 and 11 would then, in this alternative operating mode, be the reverse of that shown in FIGS. 3 to 5.

The invention claimed is:

1. A turbojet comprising:
   a first element of structure which is a main part of an external nacelle of the turbojet;
   a second element of structure which is a rear part of said nacelle; and
   a device for displacing the second element of structure relative to the first element of structure, said device comprising:
   a first rod fixed to the second element of structure;
   a second rod;
   an actuator shaft mounted on the first element of structure;
   the first rod, the second rod, and the actuator shaft being all concentric to a central axis and comprising a retracted state in which the first rod and the second rod are located in a central volume of the actuator shaft and are surrounded by the actuator shaft;
   the actuator shaft being able to pivot on the first element of structure about the central axis, by being controlled by an actuator fixed to the first element of structure;
   a first link connecting the first rod and the second rod, and a second link connecting the second rod and the actuator shaft, each of the first link and the second link being made up of a nut part and a screw part engaged in the nut part;
   a first locking means for removably securing the first rod to the second rod; and
   a second locking means for removably securing the second rod to the actuator shaft,
   wherein the first locking means and second locking means are manually switchable between a locked state and a freed state, wherein the device is configured to provide the retracted state in which the first locking means is in the locked state so that the first rod is secured to the second rod, and the first element of structure and the second element of structure form a continuous nacelle, for a main service state of the turbojet, wherein the device is further configured to provide a moderately deployed state in which the second locking means is in the freed state so that the second rod is deployed from the actuating shaft, the first locking means is in the locked state so that the first rod is secured to the second rod, and a slot is formed between the first element of structure and the second element of structure for allowing a reverse thrust by the turbojet, and wherein the device is further configured to provide a completely deployed state in which the second rod is deployed from the actuating shaft, and the first locking means is in the freed state so that the first rod is deployed from the second rod, and in which the slot has become wider than in the moderately deployed state, for a maintenance of the turbojet when not in service.

2. The turbojet according to claim 1, wherein the first locking means includes a groove provided in the second rod and a pin engaged in a thread through a wall of the first rod, and the second locking means includes another groove provided in the second rod and another pin engaged in a thread through a wall of the actuator shaft.

3. The turbojet according to claim 2, wherein the first locking means comprises a second groove provided in the second rod, said second groove and said groove of the first locking means being provided at opposite ends of the second rod.

4. The turbojet according to claim 1, wherein the actuator is a motor mounted on the first element of structure, by being maintained by an armature removable from the first element of structure.

5. The turbojet according to claim 1, further comprising an electric motor for rotating the actuator shaft through a transmission, the electric motor being mounted on the first element of structure and removable from the first element of structure, the transmission engaging with a toothed section of the actuator shaft.

6. The turbojet according to claim 1, further comprising an electric motor for rotating the actuator shaft through a transmission, the electric motor being mounted on the first element of structure and removable from the first element of structure, the transmission engaging with a toothed section of the actuator shaft, the actuator shaft being mounted in a hole of the first element of structure, the electric motor being fitted outside the hole of the first element of structure.

7. The turbojet according to claim 1, further comprising an electric motor for rotating the actuator shaft through a transmission, the electric motor being mounted on the first element of structure and removable from the first element of structure, the transmission engaging with a toothed section of the actuator shaft, the actuator shaft being mounted in a hole of the first element of structure, the electric motor being fitted outside the hole of the first element of structure, the actuator shaft being rotatably mounted on the first element of structure through bearings, an input end of the transmission being present outside the hole of the first element of structure, and being disengaged and operable by a tool when the electric motor is removed from the first element of structure.

8. A turbojet comprising:
a first element of structure which is a main part of an external nacelle of the turbojet;
a second element of structure which is a rear part of said nacelle; and
a device for displacing the second element of structure relative to the first element of structure, said device comprising:
a first rod fixed to the second element of structure;
a second rod;
an actuator shaft mounted on the first element of structure;
the first rod, the second rod, and the actuator shaft being all concentric to a central axis and comprising a retracted state in which the first rod and the second rod are located in a central volume of the actuator shaft and are surrounded by the actuator shaft;
the actuator shaft being able to pivot on the first element of structure about the central axis, by being controlled by an actuator fixed to the first element of structure;
a first link connecting the first rod and the second rod, and a second link connecting the second rod and the actuator shaft, each of the first link and the second link being made up of a nut part and a screw part engaged in the nut part;
a first locking means for removably securing the first rod to the second rod; and
a second locking means for removably securing the second rod to the actuator shaft,
wherein the first locking means and second locking means are manually switchable between a locked state and a freed state,
wherein the device is configured to provide the retracted state in which the first locking means is in the locked state so that the first rod is secured to the second rod, and the first element of structure and the second element of structure form a continuous nacelle, for a main service state of the turbojet,
wherein the device is further configured to provide a moderately deployed state in which the second locking means is in the freed state so that the second rod is deployed from the actuating shaft, the first locking means is in the locked state so that the first rod is secured to the second rod, and a slot is formed between the first element of structure and the second element of structure for allowing a reverse thrust by the turbojet,
wherein the device is further configured to provide a completely deployed state in which the second rod is deployed from the actuating shaft, and the first locking means is in the freed state so that the first rod is deployed from the second rod, and in which the slot has become wider than in the moderately deployed state, for a maintenance of the turbojet when not in service,
wherein the first locking means includes a groove provided in the second rod and a pin engaged in a thread through a wall of the first rod, and the second locking means includes another groove provided in the second rod and another pin engaged in a thread through a wall of the actuator shaft,
wherein the first locking means comprises a second groove provided in the second rod, said second groove and said groove of the first locking means being provided at opposite ends of the second rod, and
wherein the actuator is a motor mounted on the first element of structure, by being maintained by an armature removable from the first element of structure.

* * * * *